United States Patent [19]

Sterner et al.

[11] Patent Number: 5,863,592

[45] Date of Patent: *Jan. 26, 1999

[54] METHOD FOR PREPARING DEHYDRATED PEA SOUP AND PRODUCT THEREOF

[76] Inventors: Mark H Sterner, 5553 Wentworth Dr., Riverside, Calif. 92505; Mark M. Sterner, 1772 Melqua Rd., Roseburg, Oreg. 97470; Ronald S. O. Zane, 5533 Wentworth Dr., Riverside, Calif. 92505

[*] Notice: This patent issued on a continued prosecution application filed under 37 CFR 1.53(d), and is subject to the twenty year patent term provisions of 35 U.S.C. 154(a)(2).

[21] Appl. No.: 825,364

[22] Filed: Mar. 28, 1997

Related U.S. Application Data

[63] Continuation of Ser. No. 490,327, Jun. 13, 1995, abandoned.

[51] Int. Cl.⁶ ................ A23L 1/20; A23L 1/10; A23B 4/03; A23B 6/00

[52] U.S. Cl. .............. 426/634; 426/457; 426/508; 426/510; 426/511; 426/517; 426/518

[58] Field of Search ............... 426/634, 443, 426/465, 455, 457, 511, 510, 516, 517, 507, 509, 518

[56] References Cited

U.S. PATENT DOCUMENTS

| | | | |
|---|---|---|---|
| 625,880 | 5/1899 | Gere . | |
| 665,323 | 1/1901 | Gere . | |
| 707,646 | 8/1902 | Scheele . | |
| 1,071,312 | 8/1913 | Greco . | |
| 2,220,880 | 11/1940 | Baer | 83/28 |
| 2,376,485 | 5/1945 | Hermann et al. | 99/124 |
| 2,391,829 | 12/1945 | Huber | 99/124 |
| 2,392,241 | 1/1946 | Glabe | 99/206 |
| 2,657,999 | 11/1953 | Rauch | 99/204 |
| 2,996,385 | 8/1961 | Weinecke et al. | 99/103 |
| 3,291,615 | 12/1966 | Thompson | 99/98 |
| 3,433,650 | 3/1969 | Block | 99/124 |
| 3,563,768 | 2/1971 | Melnick | 99/124 |
| 3,738,848 | 6/1973 | Mader | 99/204 |
| 3,752,677 | 8/1973 | Andrews et al. | 99/124 |
| 3,821,435 | 6/1974 | Blake et al. | 426/199 |
| 3,987,207 | 10/1976 | Spaeti et al. | 426/99 |
| 4,060,645 | 11/1977 | Risler et al. | 426/302 |
| 4,073,961 | 2/1978 | Gasser et al. | 426/589 |
| 4,198,400 | 4/1980 | Biegler | 424/180 |
| 4,267,199 | 5/1981 | Koshida et al. | 426/589 |
| 4,415,599 | 11/1983 | Bos | 426/578 |
| 4,676,990 | 6/1987 | Huffman et al. | 426/634 |
| 4,717,578 | 1/1988 | Biller et al. | 426/589 |
| 4,735,816 | 4/1988 | Sterner et al. | 426/457 |
| 4,871,567 | 10/1989 | Sterner et al. | 426/461 |
| 5,079,027 | 1/1992 | Wong et al. | 426/633 |
| 5,124,170 | 6/1992 | Sterner et al. | 426/634 |
| 5,213,831 | 5/1993 | Leggott et al. | 426/241 |
| 5,232,732 | 8/1993 | Harris et al. | 426/589 |

*Primary Examiner*—Anthony J. Weier
*Attorney, Agent, or Firm*—Stetina Brunda Garred & Brucker

[57] ABSTRACT

A method for forming a dehydrated leguminous food product for reconstitution into a ready-to-eat food product. The method includes the steps of cleaning the food product, removing all unwanted material, tempering the food product until it is partially hydrated, steam cooking the food product in a low pressure steam environment, smoothly crushing the food product between at least one pair of rolls, dehydrating the food product, and breaking up the food product to a desired size. The food product produced by the present method has a moisture content of approximately 4% to 14%, and preferably 7%. The product formed by the present method is instantly reconstitutable and has the color, appearance, texture, aroma, and consistency of conventionally prepared pea soup.

34 Claims, 3 Drawing Sheets

METHOD FOR PREPARING DEHYDRATED PEA SOUP AND PRODUCT THEREOF

This application is a continuation of application Ser. No. 08/490,327, filed Jun. 13, 1995 now abandoned.

FIELD OF THE INVENTION

The present invention relates generally to food products, and more particularly to a method for producing a dried pea flake that will form an instantly reconstitutable food product having the color, appearance, texture and consistency of conventionally prepared pea soup.

BACKGROUND OF THE INVENTION

As is well known, pea soup is standard fare in many households and institutions. Traditionally, split pea soup is formed by boiling peas with various spices in large quantities of water for approximately two to three hours. Though canned pea soup is also available, the bulk, weight, and cost associated therewith makes it prohibitive for use in the food service industries.

In view of the traditional method of preparing pea soup being time consuming and canned pea soup being costly and difficult to store, there has been developed in the prior art reconstitutable pea soup which may be prepared rapidly, is less costly, and easier to store due to its reduced bulk and weight. Currently, there are two well-known methods of producing a reconstitutable pea soup. In the first method, the peas are cooked, dried, and subsequently milled to a reconstitutable powder. However, one of the major problems associated with this particular method is the agglomeration which occurs when water is added to the powder. In this respect, the addition of water to the pea powder typically results in the formation of balls of pea powder, the middles of which are impervious to water. As such, constant stirring and mixing is required to achieve the proper transition of the pea powder into solution. A second major problem associated with this method is that the texture of the pea powder is typically not smooth when the water is added thereto. In this respect, despite the constant stirring and mixing, small lumps of powder typically remain within the solution, thus causing the resultant product to have a sandy mouth feel.

The second widely practiced method is a drum-drying method wherein a pea slurry is prepared and cooked with spices. After cooking, the slurry is drum dried into flakes on a conventional drum dryer. However, this particular process is extremely costly, thus making it highly uneconomical for mass commercialization. The present invention is intended to alleviate the deficiencies associated with prior art methods of making dehydrated pea soup by providing a system and method of processing a comestible leguminous product (i.e., peas) into a quick-cooking and instantly reconstitutable pea soup product.

SUMMARY OF THE INVENTION

In accordance with the present invention, there is provided a method for forming a dehydrated leguminous food product for reconstitution into a ready-to-eat food product. The method comprises the step of inspecting, de-stoning, and cleaning the food product to remove unwanted material. Thereafter, the food product is washed to remove dirt.

After being washed, the food product is tempered to allow moisture to equilibrate throughout the same. The tempering is preferably accomplished by immersing the food product in water for approximately one hour, with the immersion time being sufficient to allow a portion of the water to be absorbed into the food product. Thereafter, the excess water is drained from the food product. Subsequent to the drainage of the water therefrom, the food product is allowed to stand for approximately three hours, with the standing time to be sufficient to allow moisture to equilibrate throughout the food product. Upon the elapse of the standing time, the food product has a moisture content of approximately 30% to 60%, and preferably about 44%.

After being tempered, the food product is cooked in a low-pressure steam environment which is between atmospheric pressure and approximately 9 PSIG. The cooking of the food product preferably occurs in a rotating steam vessel which rotates the food product so that the same is constantly tumbled and evenly exposed to the injected steam. In the preferred embodiment, the food product is cooked in a continuous steam cooker, though the same may alternatively be cooked within a rotary steam cooker. The cooking time is sufficient to soften the food product, and is approximately ten to twenty minutes. Since increased pressure shortens the cooking time, the cooking time is approximately 12 minutes when the food product is cooked at ambient pressure and approximately six minutes when the food product is cooked at 9 PSIG.

After being cooked, the food product is then rolled in a roller mill to facilitate the flaking thereof. In the preferred rolling operation, the food product is smoothly crushed by passing the same between at least one pair of rolls such that it is flattened to a thickness of between 0.004 inches and 0.200 inches, and preferably about 0.004 inches. The present invention includes a preferred device for carrying out this rolling operation. The preferred device comprises three pairs of rollers having differing diameters and differing rotational speeds such that the cooked food product, when passed through the consecutive roller pairs, will be optimally rolled, flattened and dispersed. In particular, the preferred rolling device may comprise a first pair of rollers having diameters of 20 inches, and second and third pairs of rollers having diameters of 12 inches. The first, second and third pairs of rollers are preferably in vertical alignment such that the cooked food product will pass downwardly between the rollers of the first pair, then between the rollers of the second pair, and finally between the rollers of the third pair. The three pairs of rollers are rotated at differing rotational speeds to provide the desired dispersion and density of the rolled, flattened food product. For example, when the third pair of rollers (12-inch diameter) is rotated at a surface rotational speed of 100 feet per minute, the preceding second roller pair (12-inch diameter) will be rotated at a surface rotational speed of 25 to 60 feet per minute, and the first roller pair (20-inch diameter) will be rotated at a surface rotational speed of 25 to 60 feet per minute. Thus, the cooked food product will be compressed between rollers having increasingly faster rotational speeds as it passes through the roller device, thereby resulting in the desired dispersion and flattening of the rolled, cooked food product.

After being rolled, the food product is dehydrated by passing the same into an atmospheric dryer. The drying of the food product may take place in a sectionally controlled oven in which humidity and temperature can be carefully regulated from one zone to another. Subsequent to being dehydrated, the food product has a moisture content of approximately 4% to 14%, and preferably about 7%.

Upon the completion of the dehydrating step, non-uniform pieces of the food product are broken up to a desired size by passing the same through a screen. After passing through the screen, the food product preferably has a particle size of approximately 1/8 inch to 1/2 inch.

The present method may further comprise the step of adding flavoring to the food product either prior or subsequent to the dehydration thereof. In this respect, prior to the dehydration of the food product, the flavoring may be added thereto during the cooking thereof or alternatively during the rolling thereof.

BRIEF DESCRIPTION OF THE DRAWINGS

These, as well as other features of the present invention, will become more apparent upon reference to the drawings wherein.

DETAILED DESCRIPTION OF THE PREFERRED METHOD

Figure 1:
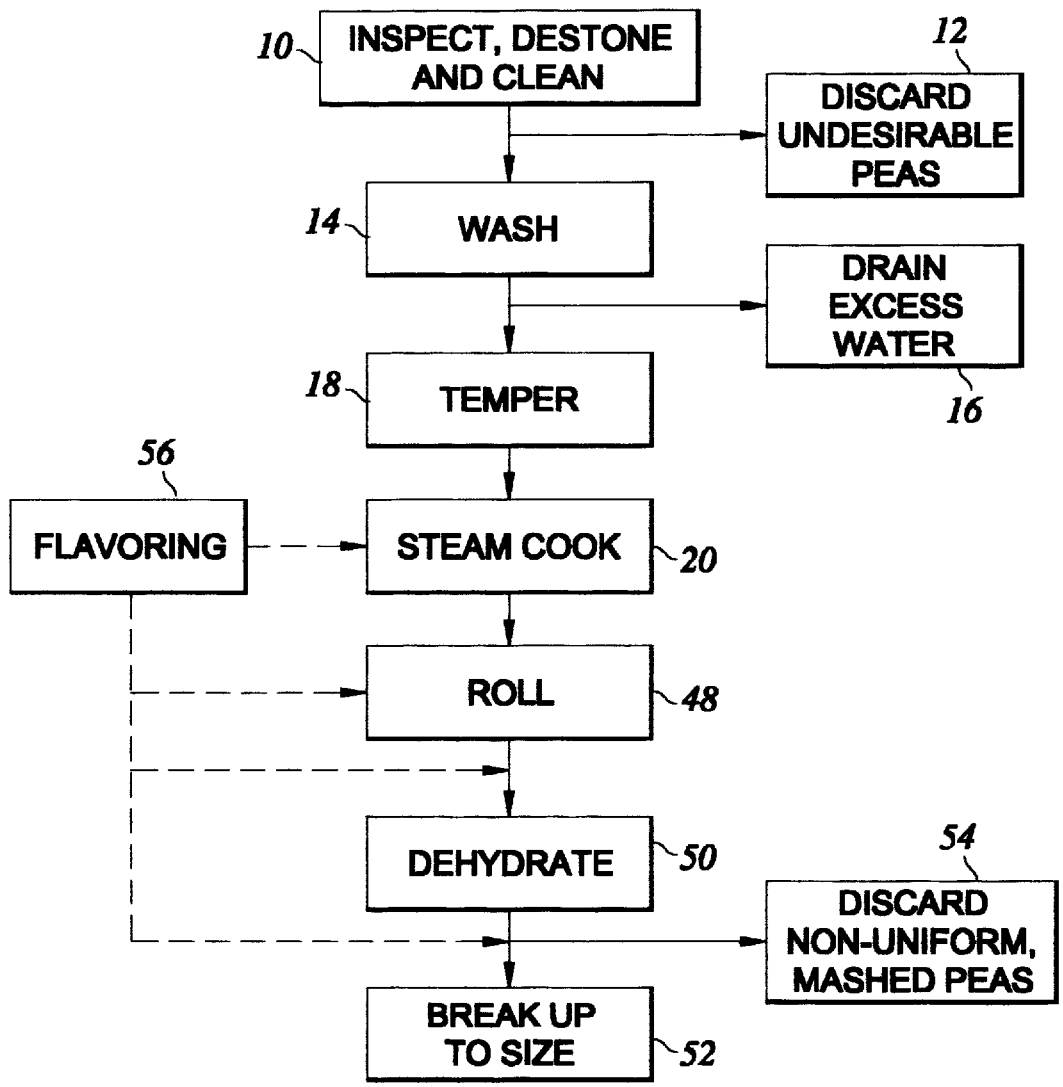
FIG. 1 is a flow chart illustrating the sequence of operations performed in the practice of the preferred method of the present invention.

The process for preparing the dehydrated pea soup is generally illustrated in FIG. 1 which depicts the presently preferred embodiment of the present invention.

The preferred method of the present invention comprises the steps of inspecting and cleaning, washing, tempering, steam cooking, rolling, dehydrating, and breaking up the legume (i.e., pea) product to a desired size. Preferably, the additional step of mixing flavoring to the pea product is also provided. The pea product produced by the present method forms an instantly reconstitutable food product having the color, appearance, texture, aroma, and consistency of conventionally prepared pea soup.

As produced, the dehydrated pea product will have a moisture content of approximately 4% to 14%, with the preferred moisture content being approximately 7%. The present method may be practiced upon various legumes, such as whole peas, split peas, and pea chips. The preferred legumes comprise green or yellow split peas. However, those skilled in the art will recognize that the present method need not be limited to these specific types of legumes.

Referring now to FIG. 1, the following discussion of the individual steps of the present method will be useful in understanding the subject invention.

INSPECTING, DE-STONING AND CLEANING

The initial inspection, de-stoning, and cleaning 10 of the peas to remove unwanted material is carried out manually or automatically in accordance with known methods in the prior art. Undesirable or substandard peas are discarded 12.

WASHING

Following inspection, de-stoning, and cleaning 10, the peas are washed 14 with water or any acceptable liquid capable of removing foreign material, such as dirt and pesticide. After washing, the peas are drained 16 and the excess water is discarded.

TEMPERING

After being washed, the peas are immersed in water for a period of approximately one-half to six hours (and preferably about one hour) until they become approximately 128% to 225% of their original dry weight due to the absorption of water thereinto. The water is then drained, and the peas set aside and left to stand for approximately three hours to allow the moisture to equilibrate throughout the peas. Such period of equilibration is referred to as "tempering" 18. As a result of the tempering, the peas are somewhat rubbery throughout, whereas if they were not allowed to equilibrate, the cores thereof would still be hard. Although the peas do not have to be fully hydrated (i.e., contain as much moisture as possible), they must be at least partially hydrated and must be evenly equilibrated. Prior to any processing, the peas typically have a moisture content of about 10%. Upon the elapse of the preferred three hour standing time, the peas have a moisture content of approximately 30% to 60%, with the moisture content preferably being approximately 44%. As those skilled in the art will recognize, various other legumes require different soaking and equilibration times.

STEAMING

Upon the completion of the tempering 18, the peas are steam cooked 20 with direct injected live steam in a low-pressure steam environment which is between atmospheric pressure and approximately 9 PSIG. By maintaining this pressure within this relatively low range, the bright green color of the peas is retained and maintained. The cooking time of the peas is sufficient to soften the same, and is approximately ten minutes to twenty minutes, with the precise cooking time being dependent on the desired color, taste, and texture for the peas.

During the cooking process, the higher the pressure at which the peas are cooked, the shorter the cooking time. As such, when the peas are cooked at atmospheric or ambient pressure, the cooking time is approximately twelve minutes. Conversely, when the peas are cooked at approximately 9 PSIG, the cooking time is generally about six minutes. Those skilled in the art will recognize that pressures and cooking times differing from those previously discussed may be optimal for some other types of legumes.

The peas are preferably placed in a rotating, substantially closed steam vessel to assure continuous contact of the peas to the steam at low to atmospheric pressure. In this respect, the rotating steam vessel rotates the peas so that the same are continuously being tumbled and evenly exposed to steam so as to facilitate the cooking of the peas equally. The cooking could also be accomplished by boiling the peas in water or exposing the peas to infrared heat sources, microwaves, etc.

Figure 3:
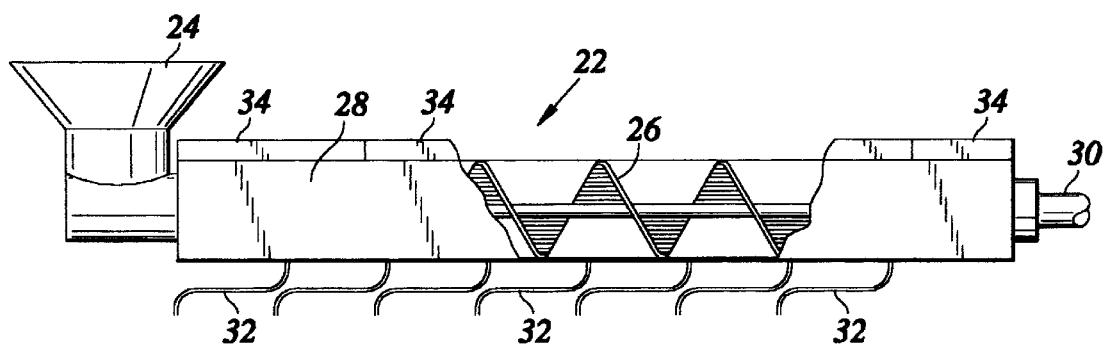
FIG. 3 is a partial cross-sectional view of a continuous screw steam cooker which may be used in the practice of the method of the present invention.

The cooking of the peas is preferably accomplished through the utilization of a continuous screw steam cooker 22 as shown in FIG. 3. The continuous screw steam cooker 22 is adapted to provide a steady output, and is used by placing the peas into a hopper 24 from which they are carried by a screw 26 through a housing 28 toward an outlet 30. Steam is supplied to the housing 28 through tubes 32 and contained therein by doors 34. The volumes of steam supplied through the tubes 32 may be varied along the length of the steam cooker 22, setting up zones of varying pressure, for example, lower pressure zones near the intake hopper 24 and the outlet 30. As those skilled in the art will also recognize, the continuous screw steam cooker 22 at the intake and outlet ends is preferably equipped with steam locks (not shown). Within the steam lock the pressure is equalized to the ambient room pressure or to the elevated cooking pressure before opening the respective steam lock door, to provide for a smooth flow of peas entering and exiting the steam cooker 22. The doors 34 provide access to the interior of the housing 28 for cleaning and maintenance.

Figure 2:
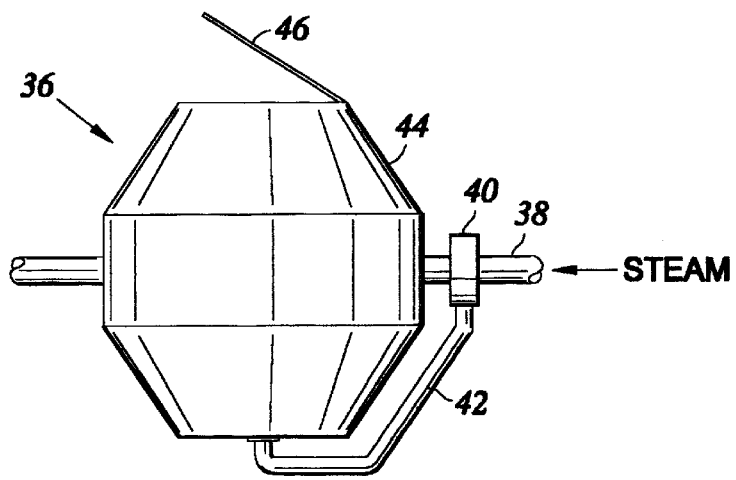
FIG. 2 is a front elevational view of a rotary steam cooker which may be used in the practice of the method of the present invention.

As an alternative to the continuous screw steam cooker 22, the peas may be cooked in a rotary steam cooker 36 as shown in FIG. 2. The rotary steam cooker 36 typically has a capacity of approximately 14 cubic feet and rotates the peas contained therein to assure even and thorough cooking. Live steam is provided via an inlet line 38 from which it travels through a coupling 40 and tube 42 into a housing 44. A lid 46 provides a means for placing the peas into and removing the peas from the rotating steam cooker 36. The steam cooker 36 is typically alternatively supplied with steam and then rotated. Injection of steam into the housing 44 when the rotary steam cooker 36 is in the upright position (with the lid 46 uppermost) insures even distribution of the steam throughout the peas within the housing 44. Subsequent rotation of the rotary steam cooker 36 mixes the peas to further insure uniform heat distribution. As will be discussed in more detail below, seasonings, flavoring, or other ingredients may be added to the peas within either the continuous screw or rotary steam cookers 22, 36.

ROLLING

Subsequent to being cooked in the aforementioned manner, the peas are flaked in roller mills by rollers to facilitate rapid dehydration and reconstitution. In the rolling process 48, the peas are smoothly crushed or moderately pressed between at least one pair of rolls. The rolling process 48 flattens the peas into flakes having a thickness of between 0.004 inches and 0.200 inches, with the preferred thickness being approximately 0.004 inches. During the rolling process 48, the peas may pass between one series of rollers or a multiple series of rollers. Importantly, the rolling process 48 produces a pea product that is smooth (rather than gritty), dries rapidly, rehydrate rapidly, and does not agglomerate when exposed to water during the rehydration process.

Figure 4:
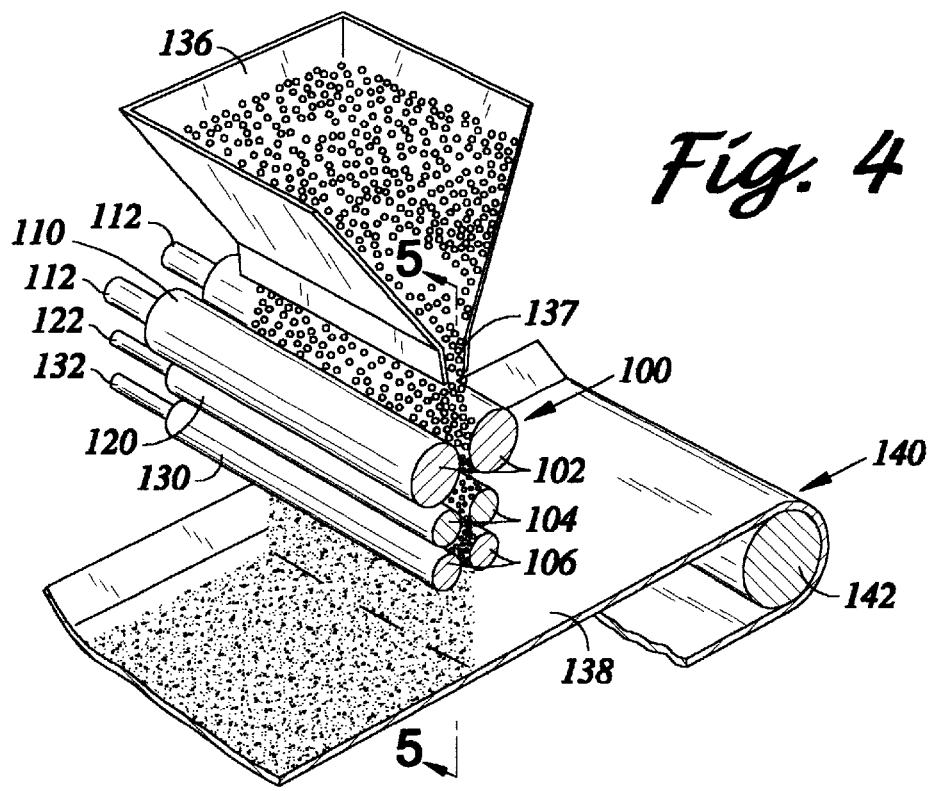
FIG. 4 is a cut-away perspective view of a preferred device for carrying out the rolling operation of the method of the present invention.
Figure 5:
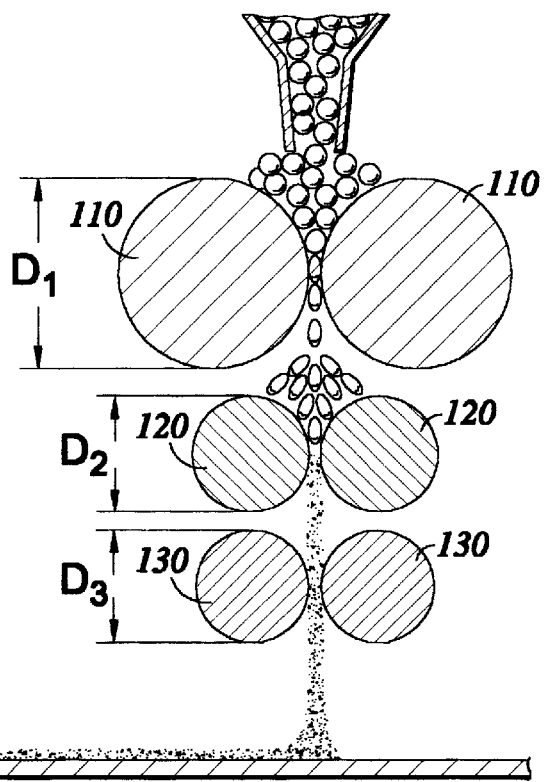
FIG. 5 is a side elevational view of the sectional showing of FIG. 4.

This rolling operation may be accomplished by different devices or systems, including the preferred rolling system shown in FIGS. 4 and 5 and described in detail herebelow.

DEHYDRATING

After undergoing the rolling process 48, the peas are then dehydrated 50. The dehydrating/drying of the peas (and in particular the flakes formed by the rolling process 48) is accomplished by the passage of the peas into an atmospheric dryer. As previously indicated, upon emerging from the atmospheric dryer, the peas have a moisture content of, approximately 4% to 14%, and preferably approximately 7%. Those of ordinary skill in the art will recognize that the peas may alternatively be dehydrated/dried in various types of drying devices, including a sectionally controlled oven in which humidity and temperature can be carefully regulated from one zone to another.

Advantageously, the dehydration 50 of the peas enables the product, in its final form, to be easily stored and handled in a space-efficient manner, unlike canned pea products currently available.

SIZING

Once the peas have been subjected to the aforementioned dehydration process 50, they are then preferably sized so as to have a substantially uniform shape and size for aesthetic and more uniform packaging density. In the sizing process 52, the peas are passed through a power sieve whereby large sized peas are reduced in size. The reduced sized peas pass through the sieve to have a uniform particle size which is preferably approximately ⅛ inch to ½ inch. Alternatively, the sieve may be sized to provide a smaller powder like consistency to the peas. Thereafter, the peas will be packaged for storage and/or shipping.

MIXING

Optionally, a flavoring 56 may be mixed with the peas either prior to subsequent to the dehydration 50 thereof. The flavoring may comprise seasonings and/or other ingredients (e.g. parsley) which is added to the peas in desired quantities for purposes of minimizing flavor loss in the resultant pea product. As previously explained, the flavoring 56 may be added to the peas during the cooking process 20 by placing the same within the continuous screw or rotary steam cookers 22, 36. Alternatively, the flavoring 56 may be added to the peas during the rolling process 48 or immediately after the dehydration process 50. The flavoring 56 may be added so that the peas, upon reconstitution, will have a desired taste and/or texture. Advantageously, the mixing of the flavoring 56 into the peas helps create a resultant pea product that has consistently uniform flavor that does not vary significantly from batch to batch.

The dehydrated pea product formed in accordance with the aforementioned method is reconstituted simply by adding water thereto. In particular, the pea product reconstitutes in hot water within approximately one minute, and reconstitutes in cold water in approximately fifteen minutes. Importantly, the reconstitution of the pea product occurs without constant stirring. Despite not being constantly stirred, the pea product does not agglomerate during reconstitution, but rather remains in suspension, thus resulting in a reconstituted pea product which is smooth and not gritty. The reconstituted pea product retains the natural green color of the peas and is microwaveable. Importantly, the present method allows for the economical production of the dehydrated pea products which have a shelf life of at least one year prior to being reconstituted.

Detailed Description of a Preferred Rolling Device

The rolling operation, which comprises one of the steps of the above-described preferred method, may be carried out using various different types of roller devices. One presently preferred roller device 100 is shown in FIGS. 4 and 5.

As shown in FIGS. 4 and 5, the preferred rolling device comprises a) a first pair of rollers 102, b) a second pair or rollers 104 and c) a third pair of rollers 106. These three roller pairs are positioned in vertical alignment such that first roller pair 102 is at the top, the second roller pair 104 is in the middle and the third roller pair 106 is at the bottom. The vertically aligned roller pairs 102, 104, 106 are located directly beneath the bottom outlet opening 138 of a containment vessel or hopper 136 such that cooked peas contained within the hopper 136 may be gravity-fed through the outlet opening 137 of the hopper 136 and subsequently between the consecutive roller pairs 102, 104 and 106. The roll gap between roller pairs is preferably approximately 0.004 inches. Further, each roller has a doctor blade (not shown) positioned across its face to remove crushed product which may adhere to the roller and direct the product onto the roller or conveyor below.

A belt conveyer or other conveyer device 138 is positioned below the third roller pair 106, such that the rolled, cooked pea product will fall onto the upper surface of the conveyer 138 after it has passed between the third 106 roller pair.

The individual rollers of the first roller pair 102 comprise cylindrical rigid roller bodies 110 which are connected to, and extend axially from, rotatable drive shafts 112. The cylindrical roller bodies 110 of the first roller pair 102 preferably have diameters $D_1$ of approximately 20 inches.

The individual rollers of the second roller pair 104 comprise rigid cylindrical roller bodies 120 which are connected to, and extended axially from, rotatable drive shafts 122. The cylindrical roller bodies 120 of the second roller pair 104 preferably have diameters $D_2$ of 12 inches.

The rollers of the third roller pair 106 comprise rigid cylindrical roller bodies 130 which are connected to, and extend axially from, rotatable drive shafts 132. The cylindrical roller bodies 130 of the third roller pair 106 preferably have diameters $D_3$ of the 12 inches.

The diameters of the rollers of each pair may be varied based on characteristics of the product and the desired production process.

An important consideration is that the first (top) roller pair 012 has a sufficient nip region to effectively grab and begin squeezing and crushing the peas. Another important consideration is that the second (middle) roller pair 104 and third (bottom) roller pair 106 have a smaller nip to afford better control in sustaining an accumulation or furrow of peas above the nip, so as to work the product into a dough before passing it to be crushed again.

During operation, the three consecutive roller pairs 102, 104, 106 are rotated at different rotational speeds to bring about the desired rolling and dispersion of the cooked pea material. The rotational speeds of the individual roller pairs 102, 104 and 106 may be adjusted, during operation, to achieve a desired density and consistency of the final product deposited on the conveyer 138. Typical rotational surface speeds of the roller bodies 110, 120, 130 (0.004 in. roll gaps) for flaking 3,750 lbs. per hour of conditioned cooked peas (44% moisture content), are as follows:

TABLE 1

| Roller Pair | Roller Body Diameter | Surface Speed of Roller Body |
| --- | --- | --- |
| First (Top) | 20 Inches | 200–275 ft./min. |
| Second (Middle) | 12 Inches | 200–275 ft./min. |
| Third (Bottom) | 12 Inches | 425–875 ft./min. |

When the roller bodies 110, 120, 130 are rotated at the same or similar speeds shown in Table 1, the cooked pea material compressed between the rollers will be progressively distended and pulled apart as it passes between the roller pairs 102, 104 and 106 as is evident from FIG. 5. In this regard, the material from the hopper 136 is closely packed and collects in a large accumulation or ferrow, above the roller gap in the nip area. Then, the material passes through the first roller pair 102 to effect an initial crush, and is metered to the roller pair 102 below. There the material becomes less tightly compressed and less dense and collects into a smaller accumulation or ferrow, and is worked into a dough consistency and passes through the second roller pair 104, exiting as a thin sheet of loosely packed material or ribbon of dough. Upon passing through the third roller pair 106 onto the conveyer 138 the material begins to break apart and is deposited as large flakes on the conveyor 138.

The speed of the conveyer 138 may be adjusted or controlled to correspond to the rate at which the rolled pea product is fed through the first second and third roller pairs 102, 104 and 106. In the device 100 shown, the conveyer 138 is disposed on a conveyer pulley system 140 which incorporates drive rollers 142 to drive the conveyer 138 at the desired rate. In this regard, the rotational rate of the drive rollers 142 may be adjusted to cause the conveyer 138 to move at a rate which is matched to or optimized in relation to the rate at which the rolled pea product is currently exiting the third roller pair 106.

Additional modifications and improvements of the present invention may also be apparent to those skilled in the art. Thus, the particular combination of steps described and illustrated herein is intended to represent only one embodiment of the present invention, and is not intended to serve as limitations of alternative methods within the spirit and scope of the invention.

What is claimed is:

1. A method for forming a dehydrated leguminous food product from a quantity of raw, dried legumes, said method comprising the steps of:

a) providing a quantity of uncooked, dried legumes;

b) tempering the uncooked, dried legumes for a first period of time;

c) cooking the legumes in a steam environment, for a period of time sufficient to soften the legumes;

d) passing the cooked legumes between first, second, and third consecutive discrete pairs of cooperating rollers to thereby produce a flattened mass of cooked leguminous food product, wherein:

1) the rollers of the first discrete pair have respective substantially identical diameters greater than the respective diameters of the rollers of the second and third discrete pairs, have a nip region sufficient to grab the cooked legumes to be passed therebetween, and have substantially the same surface speed in relation to each other and in opposing rotational direction to each other, 2) the rollers of the second discrete pair have a nip region sufficient to maintain a furrow of crushed legumes passed from the first pair of rollers and have substantially the same surface speed in relation to each other and in opposing rotational direction to each other to form further crushed legumes of a dough consistency to thereby form and deliver a ribbon of legume dough, and 3) the rollers of the third discrete pair have a nip region sufficient to accept the ribbon of legume dough passed from the second pair of rollers, have substantially the same surface speed in relation to each other and in opposing rotational direction to each other, and have a faster surface speed than the surface speeds of the first and second pairs of rollers to thereby break apart and deliver a flattened mass of cooked leguminous food product;

e) dehydrating the flattened mass of cooked leguminous food product; and f) breaking up the dehydrated mass of leguminous food product, to provide dehydrated flakes of a desired size.

2. The method as recited in claim 1 wherein step b) comprises the steps of:

immersing the food product in water, the immersion time being sufficient to allow a portion of the water to be absorbed into the food product;

draining non-absorbed water from the food product;

allowing the food product to stand, the standing time being sufficient to allow moisture to equilibrate throughout the food product.

3. The method as recited in claim 2 wherein the uncooked, dried legumes are tempered by immersion in water until the legumes reach approximately 128% to 225% of their original dry weight.

4. The method as recited in claim 3 wherein the immersion time of the legumes in the water is approximately one-half hour to six hours.

5. The method as recited in claim 4 wherein the immersion of the legumes in the water is approximately one hour.

6. The method as recited in claim 2 wherein the legumes are allowed to stand, subsequent to draining the water therefrom, for approximately three hours.

7. The method as recited in claim 2 wherein the legumes have a moisture content of approximately 30% to 60% after standing.

8. The method as recited in claim 7 wherein the food product has a moisture content of approximately 44% after standing.

9. The method as recited in claim 1 wherein step c) comprises cooking the legumes within a continuous screw steam cooker.

10. The method as recited in claim 1 wherein step c) comprises cooking the legumes within a rotary steam cooker.

11. The method as recited in claim 1 wherein step c) is conducted in a low pressure steam environment which is between atmospheric pressure and approximately 9 PSIG.

12. The method as recited in claim 1 wherein step c) is conducted in a steam environment which is a substantially closed system.

13. The method as recited in claim 9 wherein cooking the legumes within a continuous screw steam cooker comprises varying a steam environment within the steam cooker.

14. The method as recited in claim 11 wherein the cooking time is approximately 6 minutes to 20 minutes.

15. The method as recited in claim 12 wherein the cooking time is approximately 12 minutes when the food product is cooked at ambient pressure.

16. The method as recited in claim 1 wherein step d) comprises smoothly crushing the cooked legumes between roller pairs such that the legumes become flattened into a flattened mass having a thickness of between 0.004 inch and 0.200 inch.

17. The method as recited in claim 16 wherein said flattened mass has a thickness of approximately 0.004 inch.

18. The method of claim 1 wherein the rollers of the first roller pair have diameters of approximately 20 inches, the roller of the second roller pair have diameters of approximately 12 inches and the rollers of the third roller pair have diameters of approximately 12 inches.

19. The method of claim 18 wherein the rollers of said first, second and third roller pairs are positioned in vertical alignment such that the first roller pair is on top, said second roller pair is in the middle and said third roller pair is on the bottom.

20. The method of claim 1 wherein each pair of rollers is rotated at a different surface speed such that, for each 100 feet per minute of surface rotation undergone by the rollers of said third pair, the rollers of the second pair will undergo between 25 and 60 feet per minute of surface rotation and the rollers of the first pair will undergo between 25 and 60 feet per minute of surface rotation.

21. The method of claim 1 wherein step d) comprises:
passing said cooked legumes through a roller device having first, second and third pairs of roller positioned in vertical alignment, with said first pair of rollers on top, said second pair of rollers in the middle, and said third pair of rollers on the bottom, such that said cooked legumes will consecutively pass downwardly between said first, then said second, and then said third roller pairs;
said first pair of rollers comprising rollers having diameters of approximately 20 inches;
said second pair of rollers comprising rollers having diameters of approximately 12 inches; and,
said third pair of rollers comprising rollers having diameters of approximately 12 inches; and,
wherein said first, second and third pairs of rollers are rotated at differing rotational speeds such that, for each 100 ft./min. of surface rotation of the rollers of the third pair, the rollers of the second pair will undergo between 25 and 60 feet per minute of surface rotation and the rollers of the first pair will undergo between 25 and 60 feet per minute of surface rotation.

22. The method as recited in claim 1 wherein the step of dehydrating the food product comprises passing the food product into an atmospheric dryer.

23. The method as recited in claim 1 wherein step f) comprises passing the food product through a screen.

24. The method as recited in claim 23 wherein the screen is sized to break said dehydrated, flattened mass of leguminous food product into flakes which are approximately ⅛ inch to ½ inch in size.

25. The method as recited in claim 1 further comprising the steps of:
a) inspecting, de-stoning, and cleaning the food product to remove unwanted materials; and
b) washing the food product to remove dirt.

26. The method as recited in claim 1 further comprising the step of adding flavoring to the food product prior to the dehydration thereof.

27. The method as recited in claim 26 wherein the flavoring is added to the food product during the cooking thereof.

28. The method as recited in claim 18 wherein the flavoring is added to the food product during the rolling thereof.

29. The method as recited in claim 1 further comprising the step of adding flavoring to the food product subsequent to the dehydration thereof.

30. The method as recited in claim 1 wherein the food product has a moisture content of approximately 4% to 14%.

31. The method as recited in claim 30 wherein the food product has a moisture content of approximately 7%.

32. A dehydrated leguminous food product produced by the method of claim 1.

33. The food product of claim 32 wherein said food product reconstitutes in hot water in approximately one minute.

34. The food product of claim 33 wherein said food product reconstitutes in cold water in approximately fifteen minutes.

* * * * *